Aug. 6, 1963 J. L. O'DELL ETAL 3,099,841
PORTABLE FIELD TOILET
Filed Jan. 12, 1961 2 Sheets-Sheet 1

INVENTORS.
Jerry L. O'Dell
Jimmy R. O'Dell
BY John A. Hamilton
Attorney.

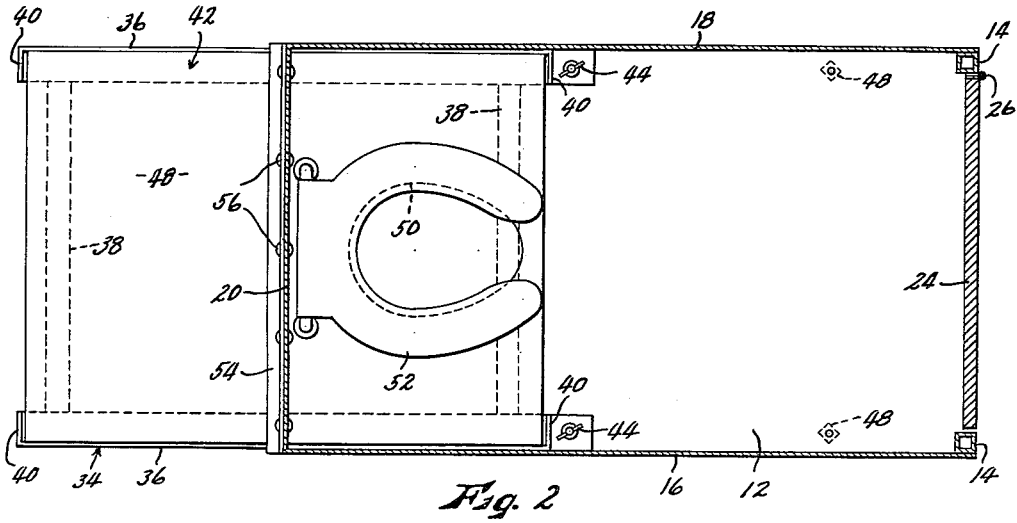
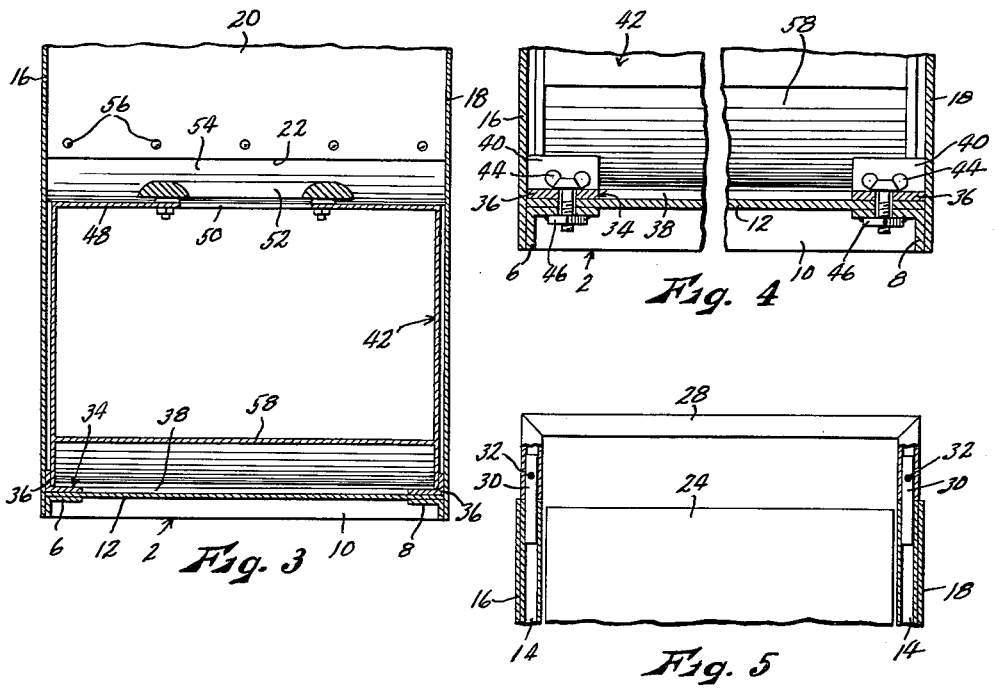
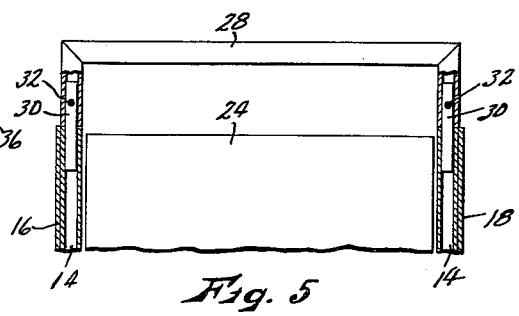

United States Patent Office 3,099,841
Patented Aug. 6, 1963

3,099,841
PORTABLE FIELD TOILET
Jerry L. O'Dell, 3109 Coronado Road, and Jimmy R. O'Dell, 3208 Coronado Road, both of Kansas City, Kans.
Filed Jan. 12, 1961, Ser. No. 82,325
1 Claim. (Cl. 4—116)

This invention relates to new and useful improvements in portable field toilets, and has particular reference to portable toilets of the type commonly employed for the convenience of workmen on construction projects.

The renting, maintenance, and servicing of toilets or sanitary units of this type has in recent years developed into a business of considerable proportions. That is, a number of units are leased to the contractor on a construction project for the duration of the job, and the lessor maintains them and periodically empties the waste tanks and cleans them to keep them sanitary and ready for use. The units fill an urgent need in an efficient manner, and have come into quite general usage.

The structures heretofore used for this purpose have been quite simple, consisting merely of a booth-like structure with a door for entry and a waste tank therein having a top opening fitted with the usual toilet seat. The tank is emptied by means of a suction hose inserted through the seat opening, and discharging into a large tank usually carried by a truck, for transportation to a disposal area. All previous units of this type within our knowledge, however, have been subject to a disadvantageous limitation of tank capacity. In an enclosure booth of sufficiently small size to pass through the door openings on the upper floors of a building under construction, the space available for the tank (below the seat and behind the forward edge thereof) is so small that the tank requires emptying so often that the servicing thereof cannot be undertaken on a commercially profitable basis. On the other hand, making the tank of a larger, commercially feasible capacity so enlarges the booth that it cannot be moved through standard door openings in a building. The usual solution is to make the tank of the larger size, and then to leave the unit at ground level adjacent the building. In this position, use thereof by workmen, particularly when engaged on the upper floors of the building, causes considerable unnecessary loss of working time. The object of this invention is, therefore, the provision of a portable field toilet which overcomes this difficulty, providing adequate tank capacity for economical servicing in a booth which is nevertheless sufficiently small to be passed through standard door openings, thereby adapting the unit for use on the upper floors of a building.

Generally, this object is accomplished by providing the booth with a movable waste tank which may be enclosed entirely within the booth or extended outwardly therefrom. When enclosed, the tank occupies a portion of the booth not available for said tank when the unit is readied for use, that is, the space provided for leg room for the occupant. When the tank is extended, the booth is ready for use, and the extended portion provides the required additional capacity.

Other objects are simplicity and economy of construction, ease and convenience in the adjustment of the tank, and adaptability for use in many applications other than that specifically stated.

With these objects in view, as well as other objects which will appear in the course of the specification, reference will be had to the drawing, wherein:

FIG. 2 is a sectional view taken on line II—II of FIG. 1.

FIG. 3 is a fragmentary sectional view taken on line III—III of FIG. 1.

FIG. 4 is an enlarged, foreshortened fragmentary sectional view taken on line IV—IV of FIG. 1, and FIG. 5 is a fragmentary sectional view taken on line V—V of FIG. 1, with parts left in elevation.

Figure 1:
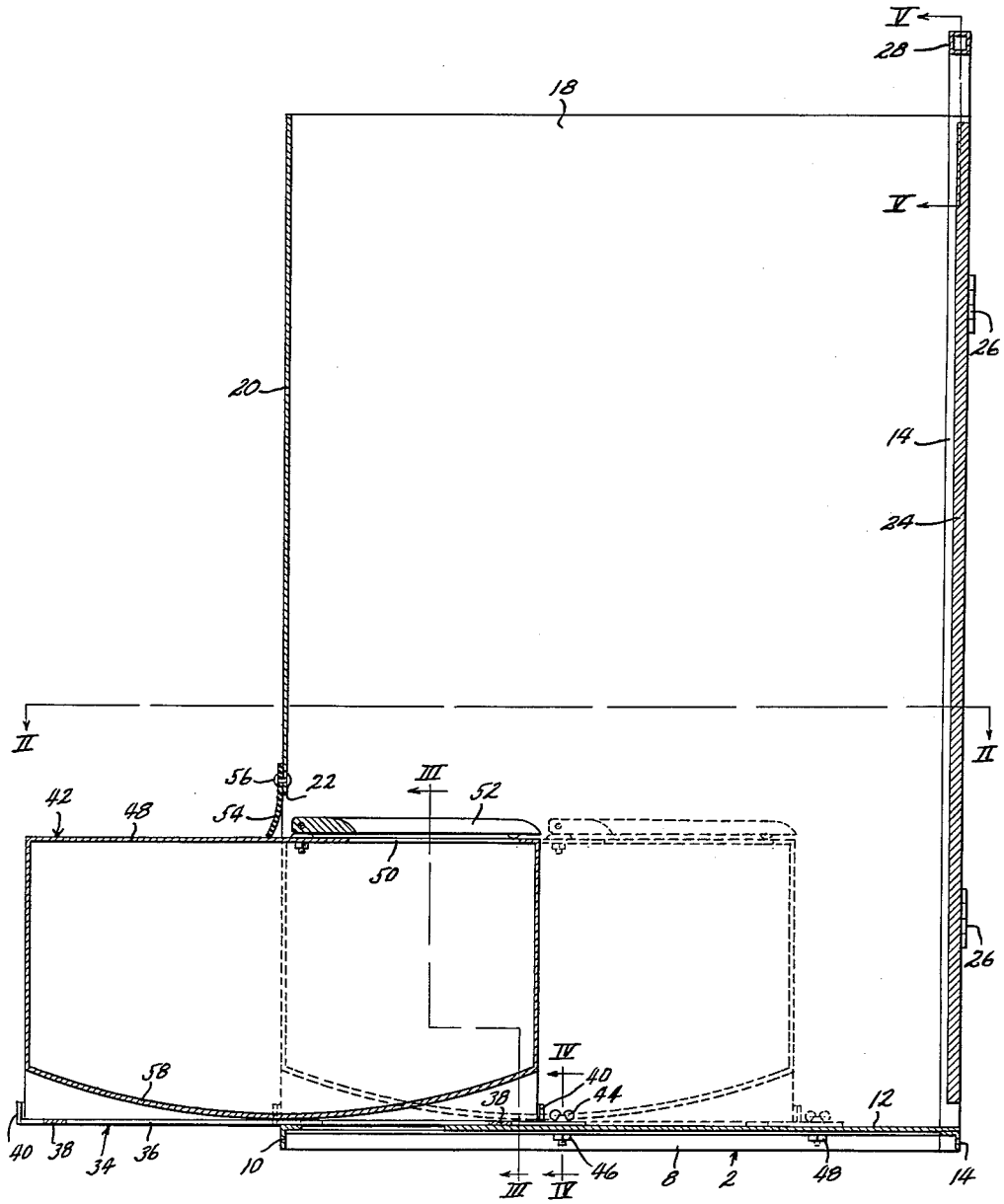
FIG. 1 is a vertical sectional view through a portable field toilet embodying the present invention, showing the waste tank extended from the booth for use in solid lines, and retracted entirely within the booth in dotted lines.

Like reference numerals apply to similar parts throughout the several views, and the numeral 2 applies generally to a base frame of rectangular form and constructed of angle iron, having a front rail 4, side rails 6 and 8, and a back rail 10, all rigidly joined together. Front rail 4 and side rails 6 and 8 support a planar floor member 12, rigidly attached thereto. Said floor need not extend all the way to back rail 10, for reasons which will presently appear. Rising vertically from each of the forward corners of frame 2 is a tubular corner post 14. A pair of side walls 16 and 18 are affixed at their lower edges to side rails 6 and 8, and rise vertically therefrom, the forward edge of each of said side walls being affixed to the associated corner post 14. A rear wall 20 extends between and is joined to the rearward edges of the side walls. The rear wall extends from the upper edges of the side walls, and the lower edge 22 thereof is spaced well above floor 12.

The structure thus far described constitutes a booth, the front of which is provided with an access door 24 hinged to one of corner posts 14 at 26. It will be understood that the walls 16, 18 and 20 may be braced or reinforced by any desired framework, not shown, if necessary. The walls may be formed of wood, metal, or other suitable material. Spreading of the upper ends of corner posts 14 is prevented by a tubular connector 28 having a dowel rod 30 (see FIG. 5) affixed in each downwardly extending leg thereof by a pin 32, and extending downwardly therefrom to engage slidably but removably in the upper end portions of said corner posts. The inverted U-shape of the connector provides necessary headroom for persons entering the booth. When the connector is removed, the total height of the booth is sufficiently reduced that it may pass freely through any standard door opening in a building structure. The booth as shown has no roof, as it is intended for use under cover and the booth is for privacy only, not shelter. However, a roof could be added within the scope of the invention.

Supported on the upper surfaces of floor 12 and rear rail 10 is a carriage 34 consisting of two upwardly and inwardly opening angle iron bars 36 slidably engaging side walls 16 and 18, and a pair of transverse bars 38 rigidly connecting bars 36. At the rearward end of each angle iron bar 36, and adjacent the forward end thereof, the vertical rib thereof is bent inwardly to form a stop 40. Supported by carriage 34 is a hollow waste tank 42 of generally rectangular form, carriage bars 36 and stops 40 preventing horizontal movement of the tank in any direction in the carriage. At the forward end of each carriage bar 36, a wing bolt 44 extends downwardly through said bar, through floor 12, through the associated frame rail 6 or 8, and is threaded removably into one or the other of two nuts 46 and 48 welded to said frame rails, said nuts being spaced apart longitudinally of carriage bars 36. When bolts 44 are engaged in nuts 46, as shown in solid lines in FIG. 1, tank 42 is disposed partially within the booth, and a part thereof extends rearwardly from said booth beneath the lower edge of rear wall 20. When bolts 44 are engaged in nuts 48, as shown in dotted lines in FIG. 1, the tank is disposed entirely within the booth.

The top wall 48 of tank 42 is planar and horizontal, and a seat opening 50 is formed in the forward portion thereof, that is, the portion thereof which is disposed within the booth whether the tank is extended or enclosed.

Said opening is fitted with a common toilet seat 52. The lower edge 22 of back booth wall 20 is disposed above tank 42 a greater distance than the height of carriage bars 36 and stops 40, in order that the tank may be lifted free of the carriage whenever desired for servicing. A flap 54 of rubber or other suitable material is affixed to the lower edge portion of wall 20 as by rivets 56, and depends therefrom to engage the top of tank 42, whereby to prevent excessive drafts of air. The bottom wall 58 of the tank is arcuately curved as shown, in order that said tank may be more easily and completely emptied by means of a suction hose inserted therein through seat opening 50.

The mode of use of the toilet, and its advantages are believed obvious from the foregoing description. The principal advantage is that with the tank 42 extendible as shown, the booth may have considerably smaller horizontal dimensions, in proportion to the capacity of the tank, than would be possible if the tank were permanently fixed in the booth, due to the inherent limitation of the size of a fixed tank by the size of the booth. In this manner, we have provided that the toilet with the tank enclosed may be sufficiently small in overall dimensions to pass through standard door openings, and at the same time the tank may be of sufficiently large capacity to make the commercial servicing thereof economically feasible. Only a field toilet meeting these conditions can in a practical way be elevated to and used on the upper floors of a building. The carriage 34 obviously could be dispensed with, if desired, and the tank secured directly to the booth. However, the carriage has the advantage of securing the tank in position as the booth is lifted or transported, while at the same time permitting the tank to be instantly removed whenever desired without necessity of releasing screws or other fasteners, and of positioning the tank accurately when it is re-inserted.

While we have shown and described a specific embodiment of our invention, it will be readily apparent that many minor changes of structure and operation could be made without departing from the spirit of the invention as defined by the scope of the appended claim.

What we claim as new and desire to protect by Letters Patent is:

A portable field toilet comprising a booth having a window formed in a wall thereof, a waste tank carried by said booth and movable from a retracted position substantially entirely enclosed within said booth to an extended position in which a portion thereof extends outwardly from said booth through said window, said tank having a seat opening in the top wall thereof and disposed within said booth when said tank is in either position, a carriage carried by said booth and supporting said tank against horizontal movement relative thereto, said carriage being horizontally movable relative to said booth for transporting said tank selectively to its extended or retracted position, and means for securing said carriage selectively in either of two positions representing respectively the extended positions and the retracted position of said tank, said tank being disengageable from said carriage by lifting it vertically upwardly therefrom, the vertical height of said window exceeding the height of said tank by an amount greater than the distance said tank must be lifted to disengage it from said carriage.

References Cited in the file of this patent

UNITED STATES PATENTS

| | | |
|---|---|---|
| 47,509 | Bagley | May 2, 1865 |
| 131,694 | Mallory | Sept. 24, 1872 |
| 1,780,099 | Steenburg | Oct. 28, 1930 |
| 2,999,247 | Kulka | Sept. 12, 1961 |

FOREIGN PATENTS

| | | |
|---|---|---|
| 301,881 | Germany | Nov. 8, 1917 |